United States Patent [19]

Keyson

[11] Patent Number: 5,784,052
[45] Date of Patent: Jul. 21, 1998

[54] VERTICAL TRANSLATION OF MOUSE OR TRACKBALL ENABLES TRULY 3D INPUT

[75] Inventor: David V. Keyson, Eindhoven, Netherlands

[73] Assignee: U.S. Philips Corporation, New York, N.Y.

[21] Appl. No.: 615,559

[22] Filed: Mar. 12, 1996

[30] Foreign Application Priority Data

Mar. 13, 1995 [EP] European Pat. Off. .............. 95200599

[51] Int. Cl.$^6$ .................................................. G09G 5/08
[52] U.S. Cl. ........................................ 345/167; 345/163
[58] Field of Search ................................ 345/164, 167, 345/156, 157, 163, 161

[56] References Cited

U.S. PATENT DOCUMENTS

| | | | |
|---|---|---|---|
| 4,868,549 | 9/1989 | Affinito et al. | 340/710 |
| 4,933,670 | 6/1990 | Wislocki | 340/709 |
| 4,982,618 | 1/1991 | Calver | 74/471 |
| 5,237,311 | 8/1993 | Mailey et al. | 340/710 |
| 5,252,970 | 10/1993 | Baronowsky | 341/20 |
| 5,298,919 | 3/1994 | Chang | 345/163 |
| 5,309,172 | 5/1994 | Fox | 345/167 |
| 5,313,230 | 5/1994 | Venolia et al. | 345/163 |
| 5,389,865 | 2/1995 | Jacobus et al. | 318/568.11 |
| 5,402,150 | 3/1995 | Stiles | 345/167 |
| 5,459,382 | 10/1995 | Jacobus et al. | 318/568.11 |
| 5,565,891 | 10/1996 | Armstrong | 345/167 |

FOREIGN PATENT DOCUMENTS

0489469A1  10/1992  European Pat. Off. ....... G06K 11/18

*Primary Examiner*—Matthew Luu

[57] ABSTRACT

A trackball enables entering 3D coordinates into a data processing system through both rotation of the ball and vertical translation of the ball relative to its casing. Software controlled tactile feedback means provides 3D tactile cues to the user when manipulating the ball. The trackball enhances interactivity in a multi-media enviroment.

7 Claims, 3 Drawing Sheets

VERTICAL TRANSLATION OF MOUSE OR TRACKBALL ENABLES TRULY 3D INPUT

FIELD THE INVENTION

The invention relates to a data processing system comprising an apparatus for processing data and an input device coupled to the apparatus to enable a user to enter data into the apparatus. The device includes a support structure and a member that is capable of undergoing a rotation around an axis with respect to the support structure in order to enter the data. In addition, the member and the support structure are capable of undergoing a translation relative to one another. The invention further relates to an input device for use in such a system and to a method of enabling a user to interact tactilely with the system.

BACKGROUND ART

Well known examples of an input device specified in the preamble are the mouse and the trackball. These devices enable the user to communicate with a PC or a work station in an ergonomic way. Both mouse and trackball comprise a rotatably suspended member, such as a ball or a cylinder, whose rotation relative to the housing controls a position of, e.g., a cursor in a two-dimensional field on a display. Typically, the mouse or trackball is provided with hand-operated selection switches enabling the user to enter selection signals into the system, e.g., to activate an icon after having selected it by positioning the cursor over the icon.

U.S. Pat. No. 5,237,311 discloses a trackball that is hingedly supported. Exerting a force on the trackball's rotatable member, vertically downward and of a magnitude greater than a pre-specified threshold, activates a binary switch to generate the aforesaid selection signal. The device thus functionally integrates a selection switch with the trackball's rotatable member. This configuration arguably solves a problem inherent in a mouse or trackball with a key operable separately from the rotatable member, namely, that of inadvertent rotation of the member when reaching for the key.

OBJECT OF THE INVENTION

It is an object of the invention to provide an input device of the kind specified in the preamble that enables the user to substantially broaden the scope of applicability of such a device and, therefore, of the data processing system.

SUMMARY OF THE INVENTION

To this end, the invention provides a system as specified in the preamble, characterized in that the device comprises data generating means operative to generate respective further ones of the data in response to the translation assuming respective ones of three or more states.

The invention is based on recognizing that the vertical movement of the rotatable member with respect to the support structure can be used for independent control of a (vertical) Z-coordinate, the (horizontal) X- and Y-coordinates preferably being conventionally controlled by turning the member. It should be stressed that this vertical control essentially extends beyond the function of a mere binary switch as in the cited art. In the known device, the vertical movement of the rotatable member is used only to implement the functionality of a selection switch. That is, vertical displacement of the member with respect to the housing in the known device can essentially assume one of only two states. According to the invention, the translational motion of the rotational member is used to generate respective data that represent respective ones of a plurality of Z-coordinates with arbitrary resolution. The generation of X- and Y-coordinates is achieved through pure rotations of the rotatable member similar to the conventional device. As a result of being able to discern three or more states of the vertical displacement, the applicability of the input device is extended to the capability to control a Z-coordinate in order to implement an ergonomic, truly three-dimensional input device.

Preferably, the device further comprises tactile feedback means to drive the member under control of the apparatus. The tactile feedback means at least comprises first drive means to affect the rotation of the member, or second drive means to affect the translation of the member and the support structure relative one another. In addition to the visual cues provided by the display, there now is a tactile cue that assists the user in navigating through the virtual workspace. Both visual and tactile cues contribute to facilitate the interaction between the system and the user. This also is of considerable importance, especially but not exclusively, to the visually impaired.

With regard to the first drive means, reference is made to European Patent Publication EP-A 0-489 469 (PHN 13522) that discloses a user-interface device providing tactile feedback for the X- and Y-coordinates. The device has a mechanism to controllably exert both negative and positive torques on the device's rotatable member so as to govern the member's rotation. These torques furnish tactile cues to the user manipulating the device, e.g., for the purpose of assisting in the control of a cursor on a display that provides visual access to the, typically two-dimensional, virtual workspace. Adding touch to the visual and/or auditory senses increases bandwidth of the information available to the user. The positive and negative torques derive from, for example, a tactile field pre-defined on the display of the data processing apparatus in order to realize preferred positions.

The second drive means is operative to exert, preferably, both positive and negative forces onto the device's rotatable member. The member is, for example, mounted on a swing arm that is made to controllably pivot around a fixed axis. The member itself can be rotated freely and independently as in conventional devices.

Preferably, the input device comprises a force sensor to sense a force exerted by the user on the input device. The sensor is operative to, for example, signal the intent of the user to initiate the entering of data into the system upon reaching a pre-specified threshold, or to allow for a margin when the member and the support structure are moved relative one another in the vertical direction, or for control of the tactile feedback means. The sensor preferably continuously senses the magnitude of the force. The sensor could comprise, for example, a strain gauge providing an analog signal that is converted into a digital format by an A/D converter for further processing.

Preferably, the tactile feedback means is user-programmable so that the user can select a desired magnitude of the intensity or of another characteristic of the tactile feedback. The user is enabled, for example, by the software application run on the system to set the values of desired parameters that determine the tactile feedback.

Such an input device is highly suitable for operating in a virtual workspace accessible through the data processing system and provided with three-dimensional tactile fields. The fields are either pre-programmed, application-controlled, user-programmable or a combination thereof.

The tactile fields mentioned in EP-A 0-489 469 could also, for example, appropriately be combined with Z-buffer information specifying for each pixel of a graphics image its relative depth to control the translational feedback.

A conventional input device or, e.g., the input device of EP-A 0 489 469 mentioned above, can itself be adapted to provide Z-coordinate control, with or without tactile feedback pertaining to the vertical motion. The conventional device then is to be mounted as a whole onto a support structure that allows for substantially vertical motion of the conventional device as a whole relative to the support structure. The data generating means then is operative to generate the data in response to the vertical translation of the conventional device as a whole with respect to the support structure. The data generated by both the conventional device and the data generating means are to be supplied to the data processing apparatus via a suitable interface (e.g., data in parallel or time-multiplexed, etc.) to enable proper discrimination between X-, Y- and Z-coordinates. Vertical tactile feedback is achieved through control of the movement of the conventional device with respect to the support structure through appropriate actuator means.

The capability of truly 3D control now provided by the system according to the invention essentially enhances the scope of user-interaction with a data processing system. For example, now that the Z-coordinate is rendered controllable in the invention, in addition to the already controllable X- and Y-coordinates, the user is enabled to navigate in a truly 3D virtual world through the input device, preferably with tactile feedback. Alternatively, or subsidiarily, manipulating the Z-coordinate can be used to control the speed of the cursor whose position is controlled by conventional rotation of the rotatable member. The cursor speed is gradually increased with gradually increasing Z-coordinate. This again may be accompanied with a vertical reaction force exerted on the member by the feedback means, the reaction force increasing with increasing depth. A software application run on the system provides control data for control of the input device's tactile feedback means. In addition to the tactile cues that can be provided by the input device of EP-A 0 489 469 mentioned above, there now is depth available through the control of the vertical position of the rotatable member with respect to the support structure.

The input device in the invention is particularly attractive to enable a user to select under tactile control between a plurality of overlapping windows displayed on his monitor. To this end, the invention provides a method of enabling a user to interact tactilely with a data processing system that includes a user-interface for providing tactile feedback to the user, e.g., of the kind discussed above. The method comprises: enabling running a multiple-window software application on the system; and enabling the user to experience a resistive force exerted by the input device substantially in a direction of the translation and to be overcome by the user when making a transition between successively overlapping windows.

Conventionally, a transition from a first window to a second window is made using a mouse or a trackball to reposition the cursor at a menu option listed outside of the window area. Instead of the cursor repositioning, the depth control now enables the user to switch significantly faster between the windows.

In a multiple-window software application, the virtual workspace is segmented into a plurality of levels. Each respective level is represented as a respective window. The windows are displayed in such a way that an opened window, i.e., the window that the user can interact with, overlaps the windows of the levels lower than that of the opened window. The visual representation therefore suggests depth. Now, in the invention, the software application generates data to provide tactile feedback to the user via the input device. For the user to go to a lower level window, he has to depress the member or the support structure against a resistive force that has a certain profile. For example, overcoming a certain force threshold is interpreted by the system as closing the current window. The letting loose of the member thereupon is interpreted by the system as selection of the next higher level window, and a continued depression as a selection of the next lower level window. The user can be assisted by the system providing visual information relating to his current position among the levels. For example, a sequence of a plurality of windows is visually represented as a sequence of a plurality of boxes. The user's position in the sequence of windows is made clear by indicating the relevant box, e.g., by highlighting. When the user now depresses rotatable member of the input device against a resistance or lets loose after having depressed the member, the next lower or higher box is indicated to confirm the transition to the next level.

Instead of the mouse or trackball according to the invention, other input devices can be used instead to interact tactilely with the multiple-window software application. Such an input device has, preferably in addition to cursor control means to control a position of the cursor, means for depth control using tactile feedback. For example, a joystick could be provided with an additional button at the top that is to be depressed by the user's thumb. The tactile feedback affects the resistance felt by the user when moving the button. Again, this tactile feedback operated button could be implemented in a variety of manners. For example, the button is spring-loaded and can slide up and down in a shaft inside of the stick. The friction between shaft and button or the spring is made controllable. Data sent from the system to the stick is converted into an analog voltage for operating an electro-mechanic transducer that in turn changes the shape of the shaft to temporarily create, e.g., an elastic snap fitting between button and shaft. Alternatively, the transducer controllably changes the compression of the spring.

Other software applications may benefit from the invention as well. For example, tests demonstrate that cursor positioning times and positioning inaccuracies are reduced significantly using tactile feedback in addition to the conventional visual feedback. The tactile feedback derives from appropriate tactile fields defined in the virtual workspace. This improvement is thought to stem from a variety of reasons. Reaction times for a single tactile stimulus are faster than those for visual or auditory cues, which leads to faster responses once the cursor enters the target area. Further, as a consequence of tactile feedback being physically applied to the input device, the time required for the user to interpret this feedback is minimal. In addition, users take advantage of a catching effect, whereby knowledge that the system will catch the cursor when entering the target area leads to faster movement behaviour.

The invention essentially extends the modes of interactivity in a multi-media environment, thus giving the user a better control over information management.

BRIEF DESCRIPTION OF THE DRAWING

Further embodiments and details of the invention are discussed herein below by way of example and with reference to the accompanying drawing, wherein.

Throughout the drawing, like reference symbols indicate similar or corresponding features.

DETAILED EMBODIMENTS

System Architecture

Figure 1:
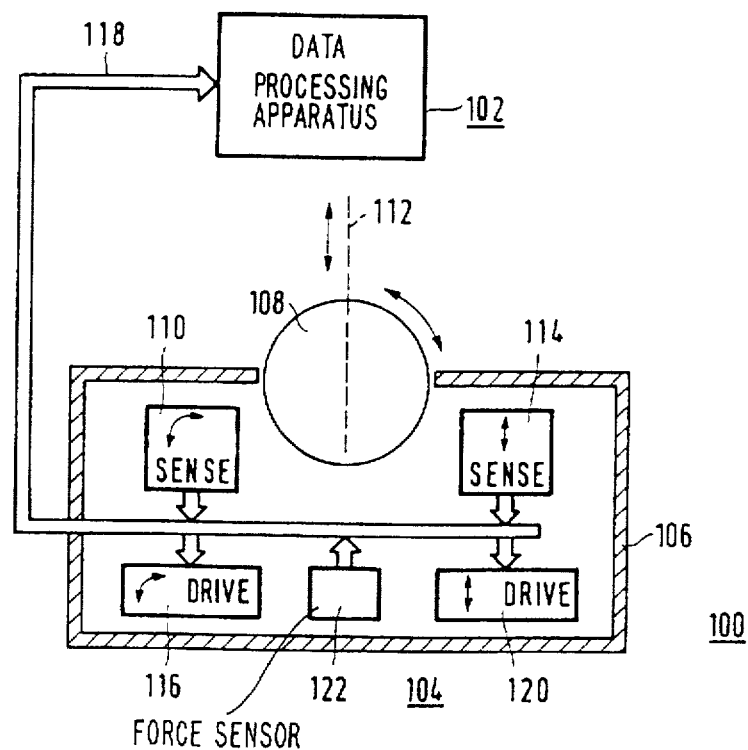
FIGS. 1 and 2 are diagrams of a data processing system of the invention.

FIG. 1 is a diagram of a data processing system 100 in accordance with the invention. Details of system 100 are discussed below with reference to FIGS. 2-5. System 100 includes a data processing apparatus 102, e.g., a PC provided with a display (not shown), and an input device 104 coupled to apparatus 102 for entering data into apparatus 102. Device 104 comprises a support structure 106 that supports a rotatable member 108, e.g., a ball or a cylinder. Device 104 comprises first sensor means 110 that senses the amount and the direction of rotation of member 108 around an axis relative to support structure 106 and translates the rotations into data for control of apparatus 102. Rotations of member 108 determine, for example, the position of a cursor (not shown) in a two-dimensional (X-Y) field on the display of apparatus 102. Such first sensor means 110 is known in the art, for example from EP-A 0-489 469, and is not discussed in further detail here.

In accordance with the invention, member 108 further is capable of being translated with respect to support structure 106, in this example substantially along a line 112 shown in phantom, i.e., substantially vertically, although other translation directions could be feasible as well. To this end, member 108 is mounted on, for example, a vertically resilient element (not shown here), a swinging arm (not shown here) that can controllably pivot in the vertical plane, or on a piston (not shown here) that can be moved up and down in a cylinder under electronically regulated fluid pressure as in a car's ABS system or in a magnetic field, etc. Device 104 comprises second sensor means 114 that is operative to sense the amount and direction of the vertical displacement of member 108 along line 112 and to convert the sensed quantities into further data for supply to apparatus 102. A plurality of embodiments of second sensor means 114 are discussed with reference to FIGS. 3-6.

Preferably, input device 104 comprises first drive means 116 to exert positive and/or negative torques on member 108 under control of apparatus 102 in order to provide tactile feedback to the user. A connection 118 between device 104 and apparatus 102 then is bi-directional to enable controlling the polarity, direction and magnitude of the torques first drive means 116. First sensor means 110 and first drive means 116 may be physically integrated with one another, e.g., in an electrical DC motor. First drive means 116 is, for example, of the type disclosed in EP-A 0 489 469 cited above and incorporated herein by way of reference. Alternatively or subsidiarily, input device 104 comprises second drive means 120 for applying a positive or negative vertical force to member 108 under control of apparatus 102 to provide further feedback, thus enabling the user to feel, e.g., depth when manipulating member 108.

An implementation of sensor means 110 and drive means 116 for a trackball input device 104 are now discussed by way of example. Sensor means 110 comprises a plurality of contact wheels (not shown) mounted in device 104 and physically contacting ball 108. The contact wheels are arranged so that rotations of ball 108 about different axes cause different ones of the contact wheels to turn accordingly. Measuring the revolutions of each of the contact wheels enables determining the resulting rotation of ball 108 and, therefore, the corresponding translation of the cursor in the displayed X-Y field. The revolutions are measured, for example, by coupling respective toothed wheels to respective ones of the contact wheels and counting the number of teeth that pass a certain reference point. Such sensor means 110 may be integrated with drive means 116 in a system that is suitable to offer tactile feedback. For example, each contact wheel and associated toothed wheel are mounted on an axis of an electric DC motor. Driving a specific one of the DC motors causes the associated contact wheel to turn, thereby turning member 108. Implementations of sensor means 114 and drive means 120 are discussed below with reference to FIGS. 3-6.

Preferably, a force sensor 122 is mounted underneath member 108 to sense the magnitude of the vertical force that the user exerts on member 108. The force measurement may be used, for example, to initiate the input of data if the user exerts a force larger than a pre-specified threshold, or to enable member 108 to follow the vertical movement of user's hand as if member 108 were floating.

Figure 2:
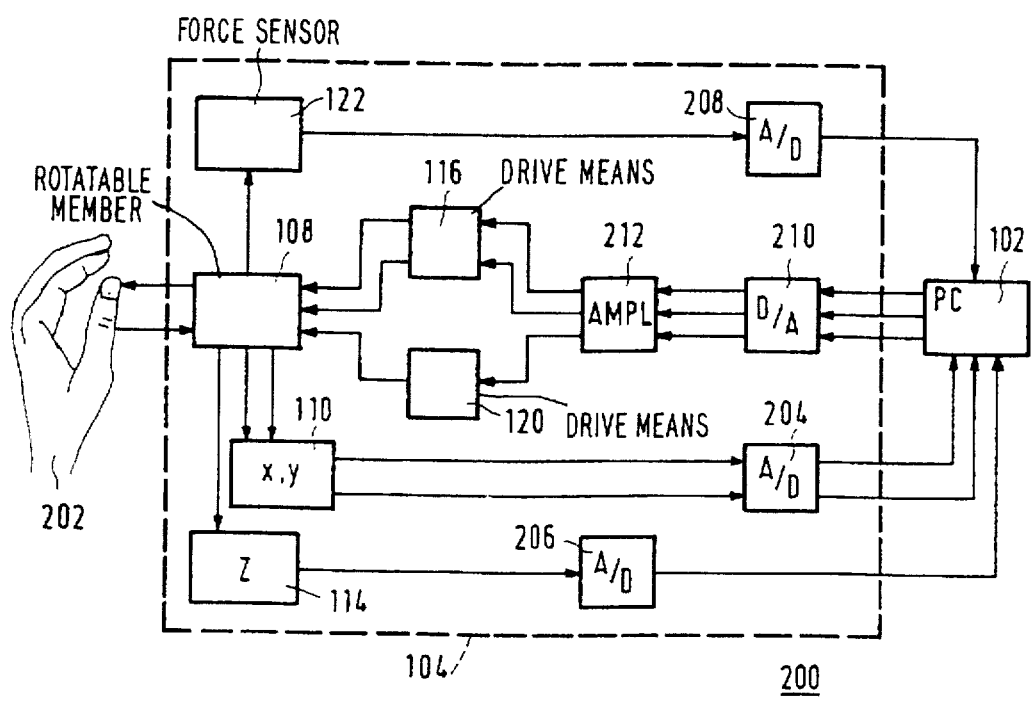

FIG. 2 is a diagram of system 100 in the invention showing the functionalities discussed above. First sensor means 110 senses the amount and direction of rotation of member 108 when user 202 turns member 108. First sensor means 110 supplies analog signals to an A/D converter 204 for two independent orientations of a rotation of member 108 in this example. A/D converter 204 supplies digital data to PC 102 representative of the sensed rotation of member 108 in order to control the movement of, e.g., a cursor on the PC's display in terms of X- and Y-coordinates. Second sensor means 114 senses the vertical displacement of member 108 under user-interaction and supplies an analog signal to A/D converter 206. A/D converter 206 supplies digital data to PC 102 indicative of the sensed vertical displacement. The vertical displacement serves, e.g., as the Z-coordinate. Force sensor 122 senses the vertical force that user 202 applies to member 108. Sensor 122 supplies an analog signal to an A/D converter 208. A/D converter 208 supplies digital data to PC 102 representative of the vertical force exerted by user 202.

In order to provide tactile feedback to user 202, PC 102 generates control data for control of first and second drive means 116 and 120. These control data may depend on the specific software application that is run on PC 102. The control data are supplied to a D/A converter 210 for conversion into analog signals. An amplifier 212 amplifies the analog control signals and supplies the amplified control signals to first and second drive means 116 and 120. Drive means 116 and 120 comprise, e.g., electric DC motors. The control signals supplied to the DC motors then are control currents or control voltages. Control of the currents provides control of the torques or forces exerted on member 108. Control of the voltages provides control of the speed at which member 108 is turned or is translated.

FIRST EXAMPLE

Figure 3:
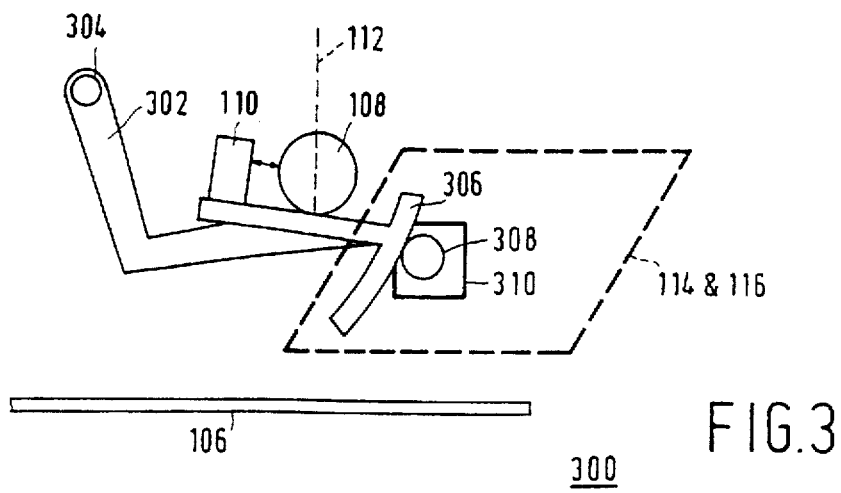
FIGS. 3-6 are diagrams of various examples of a input device of the invention.

FIG. 3 is a diagram of a first example 300 of input device 104 according to the invention. Member 108 itself is rotatably mounted on a swinging arm 302 that pivots on a shaft 304. The position of shaft 304 is fixed with respect to housing 106. Swinging arm 302 is held in an equilibrium position, e.g., by a suitably placed spring (not shown). A curved toothed bar 306 is rigidly connected to swinging arm 302. The teeth of bar 306 engage with a gear 308 whose position is fixed relative to housing 106. The vertical translation of member 108 causes arm 302 to pivot on shaft 304 thus moving curved bar 306 along an arc so as to remain engaged with gear 308. When bar 306 moves, gear 308 is driven and the amount of rotation of gear 308 is representative of the vertical distance over which member 108 has been moved. Measuring the direction and amount of rotation of gear 308 thus enables determining the magnitude and direction of the vertical displacement of member 108. Preferably, first sensor means 110 is mounted on arm 302. Force sensor 122 (not shown here) is mounted on arm 302 underneath member 108. In order to provide tactile feedback with regard to the vertical displacement along line 112, gear 308 is driven by an electro-mechanic transducer 310, e.g., an electric DC motor. Such an electric DC motor is well known in the art and needs no further discussion. Motor 310 serves to drive gear 308 under control of PC 102 via D/A converter 210 and amplifier 212. In this way, positive and negative vertical accelerations or forces can be applied to member 108.

Amplifier 212 may control motor 310 through a control voltage. When user 212 does not exert a force on member 108, the control voltage is substantially proportional to an angular speed of gear 308 and, therefore, substantially proportional to a vertical speed of member 108. If user 202 applies a force to member 108, the speed associated with the applied control voltage differs from the actual speed. User 202 then experiences a constant resistance. The speed given to member 108 may be made dependent on the vertical position of member 108 and/or on the force measured by sensor 122. PC 102 may control drive means 120 depending on the difference between a measured position and measured speed and the intended position and speed. Alternatively, amplifier 212 may control motor 310 through a control current. The current supplied to motor 310 is proportional to the torque exerted on gear 308 and, therefore, to the force exerted on member 108 via arm 302. Vertical speed and position of member 108 depend on the weight and inertia of member 108 of the other movable parts of device 104, the aforesaid suitably placed spring to define an equilibrium position, the torque supplied by motor 310 and the force measured by sensor 122. Accordingly, speed and position of member 108 can be controllably varied so as to provide an arbitrary tactile feedback to the user.

SECOND EXAMPLE

Figure 4:
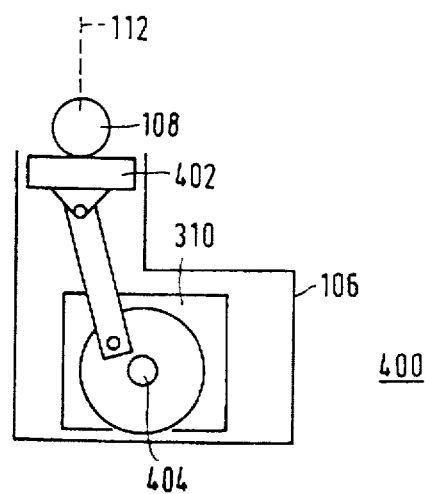

FIG. 4 is a diagram of a second example 400 of input device 104 according to the invention. Member 108 is again rotatably mounted on a platform 402 that is vertically slidable relative to housing 106, much in the same way as a piston in a cylinder. Platform 402 is coupled to crankshaft 404 so that crankshaft 404 is made to turn when platform 402 slides vertically in housing 106. The magnitude and polarity of the angle of rotation of crankshaft 404 is representative of the vertical displacement of member 108. Crankshaft 404 is connected to motor 310 to perform the functions specified with reference to FIG. 3.

THIRD EXAMPLE

Figure 5:
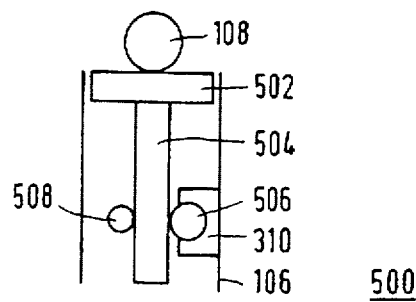

FIG. 5 is a diagram of a third example 500 of input device 104 according to the invention. Member 108 is rotatably mounted on a platform 502 that is vertically slidable relative to housing 106 as a piston in a cylinder. A bar 504 is attached to platform 502 and extends substantially transversally to platform 502. Bar 504 collaborates with a wheel 506 so as to rotate wheel 506 when bar 504 is vertically translated. Wheel 506 may be a rubber wheel in friction contact with bar 504. Alternatively, wheel 506 may be a gear whose teeth engage with teeth of toothed bar 504. The magnitude and polarity of the angle of rotation of wheel 506 is representative of the vertical displacement of member 108. Guiding wheels, such as wheel 508, may be provided to constrain the movement of bar 504 to purely vertical displacements. Wheel 506 is mounted on a shaft of motor 310 for providing tactile feedback to the user when motor 310 is made to drive wheel 506 under control of apparatus 102.

FOURTH EXAMPLE

Figure 6:
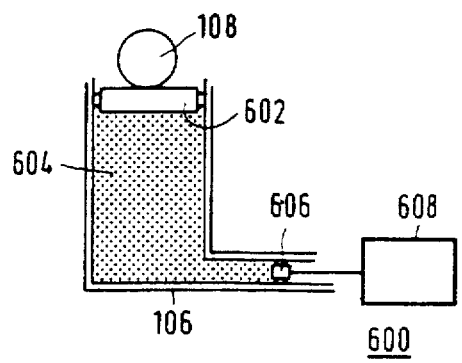

FIG. 6 is a diagram of a fourth example of input device 104 according to the invention. Member 108 is rotatably mounted on a main piston 602. Main piston 602 is vertically slidable relative to housing 106 in a cylinder 604 filled with a fluid. Upon moving main piston 602 vertically downwards, a second piston 606 is moved accordingly. An electromechanical transducer 608 translates the displacement of second piston 606 into electrical signals that are converted to digital data for supply to apparatus 102.

Above examples serve to illustrate that there is a variety of ways to monitor the vertical displacement of member 108 and a variety of ways to provide a vertical tactile feedback to the user via member 108. Windows The system of the invention is highly suitable to interact with a windows software application as is demonstrated below. A multiple-window software application organizes a plurality of subsidiary software applications in a hierarchical fashion, wherein each respective one of the subsidiary applications is represented on the display by a respective window. A window can be opened by the user to obtain access to the associated application, and closed to switch to another window. Typically, the windows are represented as overlapping, the current window on top.

Figure 7:
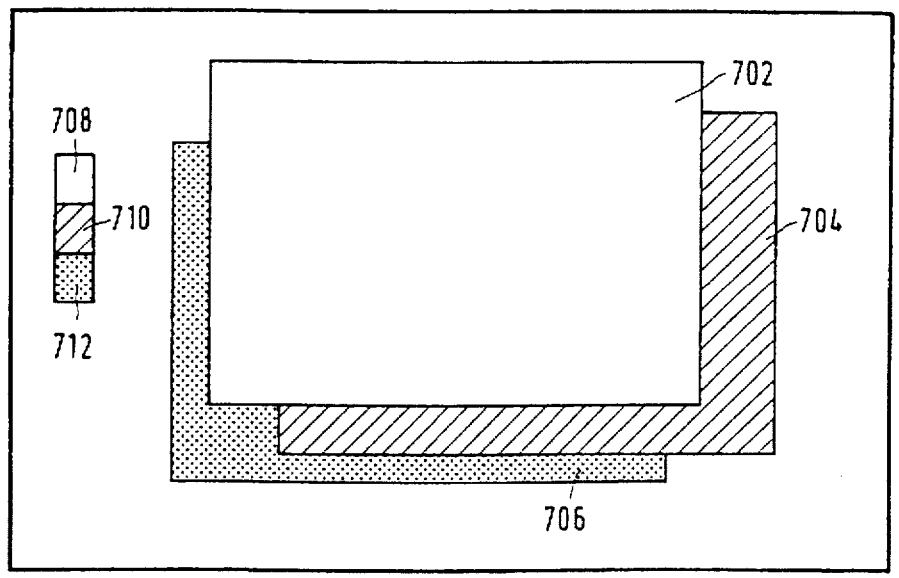
FIGS. 7-8 illustrate tactile fields to navigate in by the user when manipulating the input device in the invention.

FIG. 7 is a diagram illustrating a display 700 of apparatus 102 showing a plurality of overlapping windows 702, 704 and 706. The visual representation of overlapping windows 702–706 suggests depth. Now, in the invention, the software windows application generates data to provide tactile feedback to the user via the input device. For the user to go from current window 702 to a lower level window, e.g., window 704, he has to depress member 108 against a resistive force with a certain profile controlled by said data. For example, overcoming a certain force threshold, as measured by sensor 122, is interpreted by the system as closing the current window and going to a next higher or lower level window. The letting loose of member 108 thereupon is interpreted by the system as selection of the next higher level window, and a continued depression as selection of the next lower level window. The user can be assisted by the system providing visual information relating to his current position among the levels. For example, next to windows 702–706 on display 700 windows 702–706 are visually represented as a plurality of corresponding boxes 708, 710 and 712. The user's position in the sequence of windows is made clear by indicating the relevant one of boxes 708–712, e.g., by highlighting. When the user now depresses rotatable member 108 of input device 104 against a resistance or lets loose after having depressed the member, the next lower or higher box is indicated to confirm the transition to the next level. The bottom window, in this example window 706, preferably is indicated as such when opened in order to signal the user that he cannot push down any further.

Figure 8:
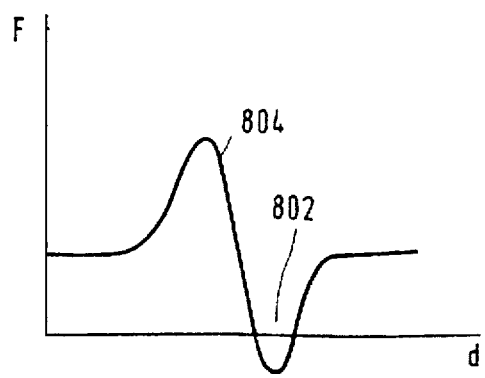

FIG. 8 is a diagram illustrating qualitatively the resistance, indicated by letter "F", felt by the user as a function of the vertical translation, indicated by letter "d", when depressing member 108 in order to switch from current window 702 to window 704. Typically, resistance F first increases and thereupon drops below the initial level to before returning to the initial level. Resistance F may become negative in a certain range 802, i.e., member 108 is given a downwards acceleration so as to give the effect of falling down to the next lower level. In order to go from window 702 to a next higher window (not indicated in the drawing), the user has, for example, to let loose member 108 after having overcome a peak 804 so as to allow member 108 to float upwards.

FIGS. 1–6 show the invention in a trackball embodiment by way of example. As the movement of member 108 is defined relative to housing 106 it is clear that the same principle is applicable to a mouse embodiment of the input device of the invention. Basically, instead of having member 108 sprung against a stationary housing 106 as in the trackball, housing 106 is made vertically moveable relative to member 108 that stays in contact with the flat surface of, e.g., the table, in the mouse embodiment. Tactile feedback with regard to the vertical degree of freedom is obtained by controlling the suspension of housing 106 relative to member 108 in the mouse embodiment much in the same way as member 108 is controllably suspended relative to housing 106 in the trackball embodiment.

The depth control or Z-coordinate control with tactile feedback could also be implemented using a conventional mouse or trackball that is provided with a push button. The tactile feedback means then controls the resistive force that the user feels when actuating the push button.

I claim:

1. A data processing system comprising:

an apparatus for processing data;

an input device coupled to the apparatus and operative to enable a user to enter the data into the apparatus, the device comprising:

a support structure;

a member that is capable of undergoing a rotation around an axis with respect to the support structure in order to enter the data, the member and the support structure being capable of undergoing a translation relative to one another;

wherein:

the device comprises a data generator operative to generate respective further ones of the data in response to the translation;

the system is capable of running a multiple-window software application; and the system enables a user to interact tactilely with the system by enabling the user to experience a resistive force exerted by the input device in a direction of the translation and to be overcome by the user when making a transition between successively overlapping windows.

2. The system of claim 1, wherein the device further comprises:

a tactile feedback generator to drive the member under control of the apparatus.

3. The system of claim 2, wherein the tactile feedback generator comprises:

a first driver to affect the rotation of the member.

4. The system of claim 2, wherein the input device comprises a force sensor (122) to sense a force exerted by the user on the member.

5. The system of claim 2, wherein the tactile feedback generator is user-programmable.

6. The system of claim 2, wherein the tactile feedback generator comprises:

a second driver to affect the translation of the member and the support structure relative one another.

7. A method of enabling a user to interact tactilely with a data processing system, wherein the system comprises:

an apparatus for processing data;

an input device coupled to the apparatus and operative to enable a user to enter the data into the apparatus, the device comprising:

a support structure;

a member that is capable of undergoing a rotation around an axis with respect to the support structure in order to enter the data, the member and the support structure being capable of undergoing a translation relative to one another;

the device comprises a data generator operative to generate respective further ones of the data in response to the translation;

the method comprising:

enabling running a multiple-window software application on the system;

enabling the user to experience a resistive force exerted by the input device in a direction of the translation and to be overcome by the user when making a transition between successively overlapping windows.

* * * * *